United States Patent
Galindo et al.

(10) Patent No.: US 11,868,368 B2
(45) Date of Patent: Jan. 9, 2024

(54) SYSTEM AND METHOD FOR IMPLEMENTING CONSENSUS IN DISTRIBUTED LEDGER ARRANGEMENT

(71) Applicant: UVUE LTD, Bury St Edmunds (GB)

(72) Inventors: David Galindo, Cambridge (GB); Jonathan Ward, Cambridge (GB)

(*) Notice: Subject to any disclaimer, the term of this patent is extended or adjusted under 35 U.S.C. 154(b) by 263 days.

(21) Appl. No.: 17/436,646

(22) PCT Filed: Mar. 6, 2020

(86) PCT No.: PCT/EP2020/056127
§ 371 (c)(1),
(2) Date: Sep. 6, 2021

(87) PCT Pub. No.: WO2020/178452
PCT Pub. Date: Sep. 10, 2020

(65) Prior Publication Data
US 2022/0129481 A1    Apr. 28, 2022

(30) Foreign Application Priority Data

Mar. 7, 2019  (EP) .................................. 19020109

(51) Int. Cl.
G06F 16/27       (2019.01)
G06F 16/23       (2019.01)
G06F 16/901      (2019.01)

(52) U.S. Cl.
CPC ........ G06F 16/273 (2019.01); G06F 16/2379 (2019.01); G06F 16/9024 (2019.01)

(58) Field of Classification Search
CPC .............. G06F 16/273; G06F 16/2379; G06F 16/9024; H04L 9/50; H04L 9/0833; H04L 9/3239; H04L 9/3297; H04L 63/108
See application file for complete search history.

(56) References Cited

U.S. PATENT DOCUMENTS 11,593,321 B2 * 2/2023 Basu ..................... G06F 16/21
2019/0123892 A1 * 4/2019 Basu ..................... H04L 9/3297

FOREIGN PATENT DOCUMENTS

WO    WO-2019113495 A1 * 6/2019

OTHER PUBLICATIONS

Fanti, Decentralized Payment Systems: Principles and Design, pp. 1-166, Jan. 19, 2019.*

(Continued)

*Primary Examiner* — Albert M Phillips, III
(74) *Attorney, Agent, or Firm* — RC Trademark Company

(57) ABSTRACT

Disclosed is a system having an input arrangement and an output arrangement. The system includes a plurality of data processing nodes to processes input data and generates output data, depending on operation of a distributed ledger arrangement to which an entry is added. A directed acyclic graph (DAG) is utilized to agree upon a set of data transactions required for adding the entry to the distributed ledger arrangement. The system employs decentralized beacon arrangement that randomly elects data processing nodes that operate to form consensus of entry to be added to the distributed ledger arrangement, pseudo-random number generator engine to rank the data processing nodes within the group; and control arrangement that enables the leading node to provide final proposal to be included in the DAG, wherein a remainder of the data processing nodes operate to notarize the final proposal to add the entry to the distributed ledger arrangement.

13 Claims, 3 Drawing Sheets

(56) References Cited

OTHER PUBLICATIONS

Hanke, DFINITY Technology Overview Series Consensus System, pp. 1-16 (Year: 2018).*
Kokoris-Kogias, Eleftherios et al., published "OmniLedger: A Secure, Scale-Out, Decentralized Ledger via Sharding" in 2018 IEEE Symposium on Security and Privacy, on May 11, 2017, pp. 583-598.
Pedro, Adan Sanchez de et al., published "Witnet: A Decentralized Oracle Network Protocol" in Arxiv .org. Cornell University Library 201, Olin Library, Cornell University Ithaca. NY 14853 on Nov. 27, 2017, 58 pages.
Azouvi, Sarah et al., published "Betting on Blockchain Consensus with Fantomette" in Arxiv.org. Cornell University Library. 201, Olin Library, Cornell University Ithaca. NY 14853. May 16, 2018, 16 pages.
Karlsson, Kolbeinn et al., published "Vegvisir: A Partition-Tolerant Blockchain for the Internet-of-Things" in 2018 IEEE 38th International Conference on Distributed Computing Systems (ICDCS), on Jul. 2, 2018, pp. 1150-1158.
Extended European Search Report issued in EP Application No. EP19020109.5 dated Aug. 27, 2019, 09 pages.
International Search Report and Written Opinion of the International Searching Authority mailed in PCT Application No. PCT/EP2020/056127 dated Aug. 11, 2020, 12 pages.

* cited by examiner

SYSTEM AND METHOD FOR IMPLEMENTING CONSENSUS IN DISTRIBUTED LEDGER ARRANGEMENT

TECHNICAL FIELD

The present disclosure relates generally to distributed ledger arrangements; more specifically, the present disclosure relates to systems that operate to implement consensus for adding entries by a configuration of data processing nodes, wherein the data processing nodes perform an organized exchange of resources, wherein the addition of the entries is performed in the distributed ledger arrangements; the added entries are useable, for example, to control systems, apparatus, equipment and such like. Moreover, the present disclosure relates to methods of (namely, methods for) operating the aforementioned systems. Furthermore, the present disclosure also relates to computer program products comprising non-transitory computer-readable storage media having computer-readable instructions stored thereon, the computer-readable instructions being executable by a computerized device comprising processing hardware to execute aforementioned methods.

BACKGROUND

With advancements in technology, processes involving recordal have increasingly been digitised. In this regard, recordal of information, for example, stages of mail delivery, stages of load scheduling, financial exchanges, service exchanges, physical resource exchanges, physical resource processing and so forth are maintained digitally thereby allowing for efficient maintenance and timely upgradation thereof. Moreover, recently, such digital records are increasingly being maintained on distributed platforms (namely, distributed ledgers) so as to prevent fallacious activities associated with the digital records.

Specifically, the distributed ledgers allow a change (for example, an addition of information as an entry, an alteration in an already added entry, and so forth) therein, only upon obtaining a mutual agreement (namely, consensus) relating to the change by participants (generally, a plurality of data processing nodes) in a distributed ledger network, thereby making the digital records reliable and secure. It will be appreciated that a given entry that causes the change includes information relating to a plurality of events, and a digital signature of a data processing node making the change, therein.

However, reaching such consensus for a given entry, by each of the participants in the distributed ledger network, consumes a lot of time and energy. Moreover, some participants may deviate from their expected behaviour that further increases a time required to reach the consensus. Such deviation from expected behaviour by some participants leads to security threats to a remainder of the participants in the distributed ledger network. Therefore, reaching the consensus by each of the participants in the distributed ledger network enforces security of the system by compromising in terms of time and energy consumption for reaching the consensus for the given entry. Subsequently, recent known approaches employ a given data processing node to reach consensus for the given entry in a defined time, thereby making the change in the distributed ledger more efficient in terms of time and energy.

However, such known approaches employing the given data processing node to reach consensus for the given entry (for example, addition of the given entry to the distributed ledger) gives the given data processing node a one-shot monopoly power over a plurality of events that are included in the given entry. Such monopoly power to the given data processing node further makes the consensus mechanism prone to malicious activities by the given data processing node. In an example, the given data processing node employed for addition of an entry to the distributed ledger adds the entry such that the entry is invalid owing to an incorrect plurality of data transactions therein and/or incorrect digital signatures therein.

Furthermore, the given data processing node employed to reach consensus for the given entry may collude with data processing nodes in the distributed ledger network to make fallacious changes to the distributed ledger, for example, by adding false events in the given entry, and so forth.

Therefore, in light of the foregoing discussion, there exists a need to overcome the aforementioned drawbacks associated with conventional methods for reaching consensus in the distributed ledger.

SUMMARY

The present disclosure seeks to provide a system that includes a plurality of data processing nodes that are mutually interconnected via a data communication network, wherein, when in operation, the system implements consensus for adding an entry to a distributed ledger arrangement to represent a temporal progression of events. The present disclosure seeks to improve performance efficiency of a decentralized computer network (implemented as the distributed ledger arrangement) in terms of improving its reliability and robustness against malicious attacks. Additionally, the present disclosure decreases "downtime" speed, and enhances security when implementing formation of a consensus for the entry to be added to the distributed ledger arrangement via use of the distributed, secured, and reliable system.

The present disclosure also seeks to provide a method of (for) operating a system that includes a plurality of data processing nodes that are mutually interconnected via a data communication network, wherein, when in operation, the system implements consensus for adding an entry to a distributed ledger arrangement to represent a temporal progression of events in a distributed ledger arrangement.

In one aspect the present disclosure provides a system having an input arrangement that receives input data, and an output arrangement that provides output data, wherein the system includes a plurality of data processing nodes that are mutually coupled together via a data communication network to enable an exchange of data therebetween when in operation, wherein the plurality of data processing nodes processes the input data and generates the output data, depending on operation of a distributed ledger arrangement to which an entry is added to represent a temporal progression of events, wherein a directed acyclic graph (DAG) is utilized to agree upon a set of data transactions required for adding the entry to the distributed ledger arrangement, wherein the system, when in operation, employs:

(i) a decentralized beacon arrangement that randomly elects a group of data processing nodes that operate to form a consensus on the entry to be added to the distributed ledger arrangement;

(ii) a pseudo-random number generator engine to rank the data processing nodes within the group, wherein an order of adding a given data transaction to the directed acyclic graph is based on ranking of the data processing nodes within the group, wherein a given data processing node of the group is designed (designated) by the system as a leading node of the group; and (iii) a control arrangement that enables the leading node to provide a final proposal to be included in the directed acyclic graph, wherein a remainder of the data processing nodes of the group operate to notarize the final proposal to add the entry to the distributed ledger arrangement, characterized in that (iv) the control arrangement utilizes one or more algorithms to determine a structure of the directed acyclic graph when rewarding the data processing nodes of the group; and (v) the system locks the stakes provided by the group of data processing nodes to access the validation process that is employed to form the consensus for the entry, for a given period of time.

The present disclosure is of advantage that a robust and reliable mechanism is provided to form a consensus for adding an entry to the distributed ledger arrangement, for example robust from malicious third-party attacks. Moreover, the present disclosure is of advantage such that the system implements secure addition of the entry requiring less processing power and thus, consumes less energy (significantly reduced electricity consumption) and also expends less time for addition of the entry (significantly faster temporal response). Such mechanism employed by the system to facilitate effective consensus for addition of the entry enhances security of the system (for example, this may also be understood as security enhancement in a way analogous to encryption of data or encryption keys, which as a result, prevent access to a file or to a system) by preventing attacks, such as cyber-attacks, and further enhances utility of the system with regard to energy and time. Such efficiency against energy and time consumption makes the system competent for enhanced performance, for example real-time control of physical systems, and saves cost of operation thereof.

Optionally, the data processing nodes in the group of data processing nodes have mutually identical stakes to access a validation process that is employed to form the consensus.

Optionally, the input arrangement and the output arrangement are coupled to a physical environment, wherein the input data includes sensed data representative of measurements from the physical environment, and the output data includes operative data to cause one or more changes within the physical environment, and wherein the entry added to the distributed ledger arrangement is employed to change a physical state of the physical environment.

Optionally, the plurality of data processing nodes operate to add vertices to the DAG asynchronously.

Optionally, one or more Schelling schedules specify a time interval in which data processing nodes of the group are expected to add a given data transaction to the DAG.

Optionally, the control arrangement provides a mechanism for at least partially anti-coordinating transactions to be included in the DAG, wherein the control arrangement utilises one or more algorithms to determine a structure of the DAG when rewarding the data processing nodes of the group, wherein (iii) the mechanism employs a strict ordering of nodes by specifying a time interval in which the data processing nodes are expected to add a given data transaction to the DAG, and (iv) the strict ordering is at least partially arbitrary, wherein the data processing nodes are assigned different slots in successive epochs of the distributed ledger arrangement (DAG).

In another aspect the present disclosure provides a method for (of) operating a system having an input arrangement that receives input data, and an output arrangement that provides output data, wherein the system includes a plurality of data processing nodes that are mutually coupled together via a data communication network to enable an exchange of data therebetween when in operation, wherein the plurality of data processing nodes processes the input data and generates the output data, depending on operation of a distributed ledger arrangement to which an entry is added to represent a temporal progression of events, wherein a directed acyclic graph is utilized to agree upon a set of data transactions required for adding the entry to the distributed ledger arrangement, wherein the method includes:

(i) utilizing a decentralized beacon arrangement that randomly elects a group of data processing nodes that operate to form a consensus of the entry to be added to the distributed ledger arrangement;

(ii) utilizing a pseudo-random number generator engine to rank the data processing nodes within the group, wherein an order of adding a given data transaction to the directed acyclic graph is based on ranking of the data processing nodes within the group, wherein a given data processing node of the group is designed (designated) to be a leading node of the group; and (iii) utilizing a control arrangement that enables the leading node to provide a final proposal to be included in the directed acyclic graph, wherein a remainder of the data processing nodes of the group operate to notarize the final proposal to add the entry to the distributed ledger arrangement, characterized in that the method further includes:

(iv) arranging for the control arrangement to utilize one or more algorithms to determine a structure of the directed acyclic graph when rewarding the data processing nodes of the group; and (v) arranging for the system to lock the stakes provided by the group of data processing nodes to access the validation process that is employed to form the consensus for the entry, for a given period of time.

Optionally, the data processing nodes in the group of data processing nodes have mutually identical stakes to access a validation process that is employed to form the consensus.

Optionally, the method includes arranging for the input arrangement and the output arrangement to be coupled to a physical environment, wherein the input data includes sensed data representative of measurements from the physical environment, and the output data includes operative data to cause one or more changes within the physical environment, and wherein the method includes employing the entry added to the distributed ledger arrangement to change a physical state of the physical environment.

Optionally, the plurality of data processing nodes operate to add vertices to the DAG asynchronously.

Optionally, the method employs one or more Schelling schedules to specify a time interval in which data processing nodes of the group are expected to add a given data transaction to the DAG.

Optionally, the method comprises arranging for the control arrangement to provide a mechanism for at least partially anti-coordinating transactions to be included in the DAG, wherein the control arrangement utilises one or more algorithms to determine a structure of the DAG when rewarding the data processing nodes of the group, wherein (iii) the mechanism employs a strict ordering of nodes by specifying a time interval in which the data processing nodes are expected to add a given data transaction to the DAG, and (iv) the strict ordering is at least partially arbitrary, wherein the data processing nodes are assigned different slots in successive epochs of the distributed ledger arrangement (DAG).

In yet another aspect, an embodiment of the present disclosure provides a computer program product comprising a non-transitory computer-readable storage medium having computer-readable instructions stored thereon, the computer-readable instructions being executable by a computerised device comprising processing hardware to execute steps of the aforementioned method.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
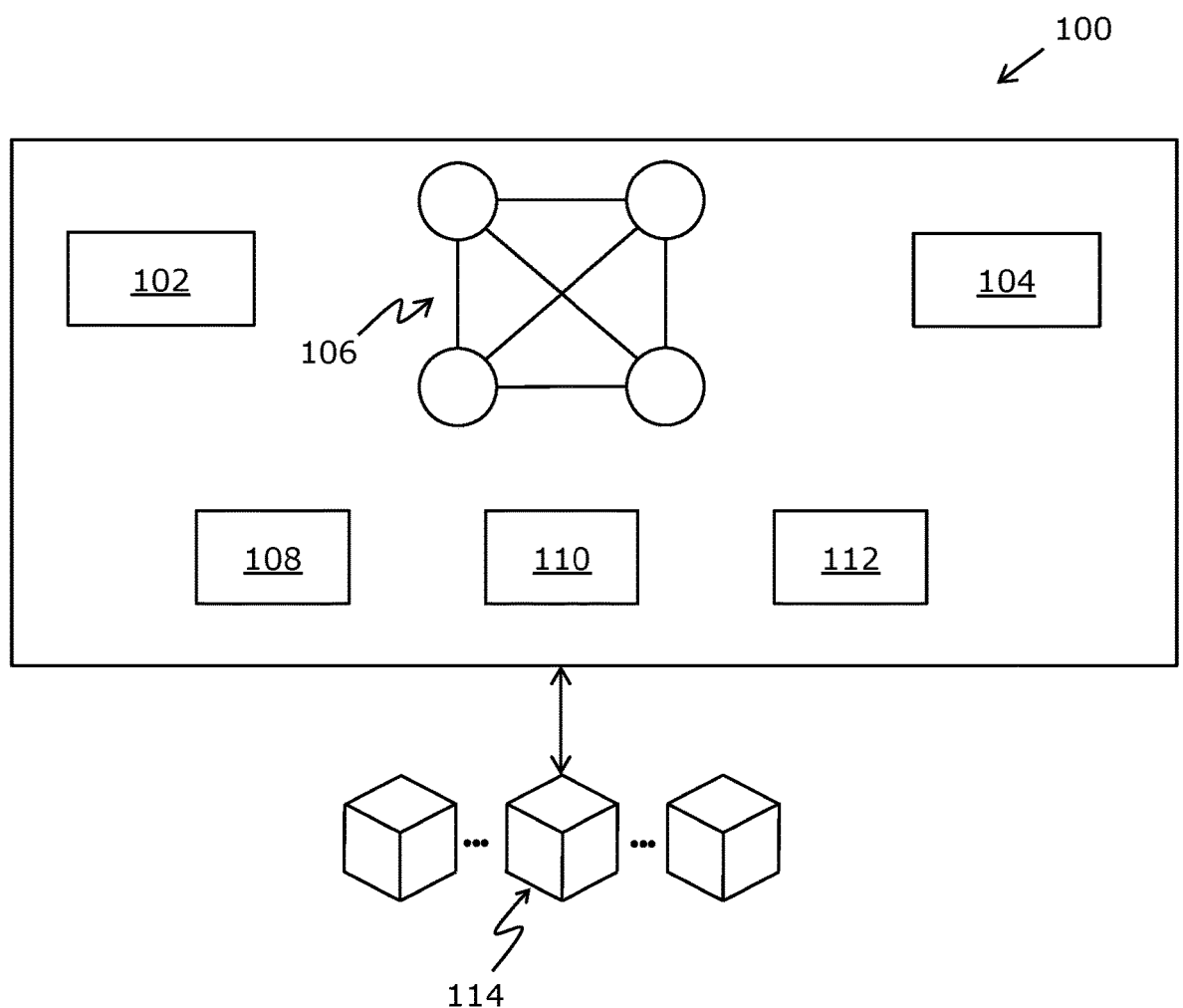
FIG. 1 is an illustration of a system that operates to implement consensus for adding an entry to a distributed ledger arrangement, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure seeks to provide a solution to a plurality of technical problems associated with addition of the plurality of data transactions as an entry in the distributed ledger arrangement. The system is of advantage to implement the consensus for addition of the entry to the distributed ledger such that the consensus is established without compromising any one of: security, run-time, fault tolerance. The system operates to reduce potential misconduct behaviours by data processing nodes in the distributed ledger arrangement network by preventing a data processing node from gaining an authority for addition of an entry in the distributed ledger arrangement. Moreover, the system described in the present disclosure is of advantage to implement consensus for addition of the entry, thereby building the distributed ledger arrangement possessing strict ordering, uniform time for addition of entries to the distributed ledger arrangement, robustness against security threats and ability to scale the system based on needs. It will be appreciated that linear distributed ledger arrangement enables strict ordering, thereby making the arrangement more reliable, time efficient and manageable. The system integrates properties of linear distributed ledger arrangement with properties of decentralised DAG based consensus schemes to achieve a platform. The platform aims to offer improved operating reliability, time-efficiency, and manageability properties of the linear distributed ledger arrangement and robustness against malicious activities, misconduct behaviours and fraudulent cases, and enhanced scalability properties of DAG-based consensus schemes implemented to build the distributed ledger arrangement, as well as providing a protocol for addition of the entry to the distributed ledger arrangement. Therefore, the system enables addition of the entry to the distributed ledger such that the entry is not added by a single data processing node in the distributed ledger arrangement network, but rather is added upon reaching a consensus by the group of data processing nodes so as to prevent misuse of authority of a single data processing node. Moreover, the system enhances security and throughput of the distributed ledger arrangement by employing (within the computer network) a coordination mechanism (for example, implemented using a mathematical function) to maintain asynchronicity (i.e. asynchronous operation) across the DAG associated with the entry. For example, such security enhancement may, to an extent, be understood in a way to be analogous to encryption of data or encryption keys, which as a result, prevent unauthorised access to a file or to a system.

Additionally, the system aims to fairly incentivise the data processing nodes so as to encourage them to participate in the consensus mechanism truthfully.

Beneficially, the system operates to perform at an optimum speed without any scaling in initial resources (for example, computing power, energy consumption, and so forth) to implement the process involved therein, thereby making the system more energy efficient and energy effective. Additionally, with a gradual increase in the data processing nodes in the distributed ledger arrangement, the system, however, does not compromise in terms of security and speed, thereby making the system more secure, advantageous and economic in terms of operation.

Pursuant to embodiments of the present disclosure, an entry is added to the distributed ledger arrangement so as to prevent fraudulent cases and to maintain a record thereof. By adding the entry of, for example, an exchange of information, the aforementioned system provides parties performing the exchange with a proof for participating in the exchange of the information.

The present disclosure, addresses said problem by operating to facilitate a consensus for addition of an entry in the distributed ledger by way of a protocol similar to a proof-of-stake method, thereby preventing the plurality of data processing nodes from utilising huge amount of time and resources (such as processor energy consumption, processor energy dissipation, heat generation in processing hardware, cooling energy applied to processing hardware, wear-and-tear on computing hardware or any other measure associated with processing resources) for forming the consensus.

In the context of the present invention, the system includes the plurality of data processing nodes that are mutually coupled together via the data communication network to enable an exchange of data therebetween when in. Such a plurality of data processing nodes comprises a plurality of computing devices, wherein the plurality of data processing nodes, and therefore the plurality of computing devices, are arranged in a decentralised form. The system requires the presence of the plurality of data processing nodes interconnected via the data communication network to perform the method steps. The term "the plurality of data processing nodes" refers to computational elements that are operable to respond to, and processes instructions that drive, the distributed computational system. Optionally, the plurality of data processing nodes includes, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, an application-specific integrated circuit (ASIC), customized digital hardware, or any other type of processing circuit. Furthermore, the plurality of data processing nodes are one or more individual processors, processing devices and various elements associated with a processing device that may be shared by other processing devices. Additionally, the plurality of data processing nodes, processing devices and elements are arranged in various architectures for responding to and processing the instructions that drive the system. Beneficially, such arrangement of the plurality of data processing nodes provides adaptability and flexibility to the distributed computing system.

Optionally, the plurality of data processing nodes are processing devices that operate automatically. In such regard, the plurality of data processing nodes are equipped with artificial intelligence algorithms that responds to and performs the instructions that drive the system based on data learning techniques. More optionally, the plurality of data processing nodes are processing devices that responds to and performs the instructions that drive the system based on an input provided from a user.

Moreover, the plurality of data processing nodes are communicably coupled to each other via the data communication network. Optionally one or more subsets of the plurality of data processing nodes communicate with each other. The data communication network allows for communication among the plurality of data processing nodes. In other words, each of the plurality of data processing nodes are capable of communicating with other data processing nodes via the data communication network. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed, for example VoIP.

In an example embodiment, the data communication network is implemented as a distributed peer-to-peer (P2P) network of interconnected plurality of computing nodes.

The system has the input arrangement that receives input data and the output arrangement that provides output data. Throughout the present disclosure, the term "input arrangement" refers to a computational element or an assembly of a plurality of computational elements that is operable to receive the input data. Optionally, the input arrangement pre-processes the input data to convert thereto in a desired form. More optionally, input arrangement may comprise at least one of: a receiver to receive the input data, a processor to pre-process the input data to a desirable form, a transmitter to transmit the pre-processed input data. The input arrangement transmits the pre-processed data to the plurality of data processing nodes. Optionally, the input arrangement provides a medium to input information thereto. Additionally, optionally, the input arrangement may comprise a sensor arrangement, implemented using sensors and other peripheral devices, to receive the input data from a physical system connected to the system. It will be appreciated that the input arrangement is operated by a user to provide the input data thereto.

Optionally, the term 'user' as used in the present disclosure, refers to an entity including a person (i.e., a human being) or a virtual personal assistant (an autonomous program or a bot) equipped with artificial intelligence.

Pursuant to embodiments of the present disclosure, the term "input data" refers to raw information received by the input arrangement for processing thereof. Optionally, the input arrangement receives the input data from a physical system connected to the system. More optionally, the input arrangement receives the input data from a user. In a first example, input data is acquired, using a sensor arrangement, from a physical system, wherein the physical system is implemented as a plurality of loads connected to an electric grid. In such case, the input data comprises information relating to power consumed by each of the plurality of loads connected to the electric grid. In a second example, the input data is provided by at least one user of the system. In such case, the input data comprises information relating to financial transactions performed by each of the at least one user.

Furthermore, the term "output arrangement" refers to a computational element or an assembly of a plurality of computational elements that is operable to provide the processed data (namely, the output data). Optionally, the output arrangement may comprise at least one of: a receiver to receive data, a processor to process the data to a desirable form, a transmitter to transmit the data as the output data. More optionally, the output arrangement provides the output data to the user of the system. Additionally, optionally, the output arrangement provides the output data using a medium, for example, a display, a set of signals, and so forth. Furthermore, optionally, the output arrangement provides the output data to the physical system so as to facilitate effective operation of the physical system. In an example, the output arrangement provides validated record of events of the physical system. In such case, the output arrangement enables effective operation of the physical system by enhancing a run-time and security of the physical system.

Furthermore, throughout the present disclosure, the term "output data" refers to information (namely, processed data) provided by the output arrangement for utilisation thereof. In the first example, wherein the acquired input data comprises information relating to power consumed by each of the plurality of loads connected to the electric grid. In such a case, the output data may comprise information relating to a validation of the information relating to power consumed by each of the plurality of loads connected to the electric grid.

Optionally, the input arrangement provides the input data received, to the plurality of data processing nodes for processing thereof and the output arrangement provides processed data generated by the plurality of data processing nodes as the output data. In such a case, optionally, the input arrangement and the output arrangement are employed based on the input data to be received and the output data to be generated by the plurality of data processing nodes.

The plurality of data processing nodes processes the input data and generates the output data, depending on operation of a distributed ledger arrangement to which an entry is added to represent the temporal progression of events. It will be appreciated that the input arrangement and the output arrangement in the system are dependent on the operation of the distributed ledger arrangement. In such case, the input data received by the input arrangement is information related to the events to be stored in the distributed ledger arrangement as the entry. Specifically, the system of the present disclosure employs a distributed ledger arrangement to which the entry is added to represent a sequential and temporal progression of events. It will be appreciated that the system employing the distributed ledger arrangement for operation thereof, when operated, provides a mechanism for recording events as the entry therein such that the entry is added only upon validation thereof. Moreover, the entry represent a sequential progression of the events thereby enabling tracking of the events.

Pursuant to embodiments of the present disclosure, the events are to be added (namely, recorded) as the entry to the distributed ledger arrangement so as to prevent fraudulent cases and to maintain a record thereof. By adding the events of, for example, power consumption of a load node, the aforementioned system provides a validated and an immutable proof of the power consumption by the load node, thereby preventing any fraudulent case such as inaccurate billing, and so forth.

The input arrangement and the output arrangement are coupled to a physical environment, wherein the input data includes sensed data representative of measurements from the physical environment, and the output data includes operative data to cause one or more changes within the physical environment, and wherein the entry added to the distributed ledger arrangement is employed to change a physical state of the physical environment. Pursuant to embodiments of the present disclosure, the input arrangement acquires the input data from the physical environment (namely, the physical system connected to the system) such that the input data includes the sensed data representative of measurements. Specifically, the measurements associated with the physical environment denotes parameters associated therewith, wherein the sensed data provides a value for such parameters associated with the physical environment. Additionally, the output arrangement provides the output data to the physical environment such that the output data includes the operative data. Specifically, the operative data is employed by the physical environment to efficiently perform an operation. The operation performed by the physical environment by using the output data causes a change in the physical environment. Furthermore, the acquired input data and generated output data, operates to facilitate an event, wherein the event is added as an entry to the distributed ledger arrangement. Moreover, adding the event as entry to the distributed ledger arrangement changes a physical state, for example, a sequential upgradation of the event, of the physical environment. Optionally, such a change in the physical state contributes to a progression of events in the physical environment.

Furthermore, optionally, each of the plurality of data processing nodes may have an input arrangement and an output arrangement associated therewith. In an exemplary implementation of the system of the present disclosure, the distributed ledger arrangement is used to track and record different stages in a physical environment implemented as a food manufacturing process or a food delivery process. In such a case, the distributed ledger arrangement is employed to track and record events such as stages of the food delivery process namely, origin, transport, distribution and sale of food products. Therefore, in such implementation, data processing nodes associated with each stage of the food delivery process employ respective computing devices thereof as input arrangements to provide the input data to be stored as the entry on the distributed ledger arrangement. Furthermore, data processing nodes are provided with output arrangements (such as, computing devices thereof) to access output data, such as status and information related to each stage of the food delivery process, from the distributed ledger arrangement. Subsequently, the entry added to the distributed ledger arrangement, relating to each stage of the food delivery process is employed to change a physical state, for example, an upgradation of information regarding status of delivery process for a given food product, of the food delivery process.

Furthermore, throughout the present disclosure, the term "distributed ledger arrangement" refers to a ledger (such as a database) of data transactions such as operations and/or contracts. In this regard, the ledger is consensually shared and synchronised across multiple sites, institutions or geographies. Pursuant to embodiments of the present disclosure, the distributed ledger refers to a database of entries, wherein the entries comprise the records of data transactions therein. Moreover, the distributed ledger is consensually shared and synchronised in a decentralised form across the plurality of data processing nodes. Optionally, such data processing nodes are established across different locations and operated by different users. Beneficially, the distributed ledger eliminates the need of a central authority to maintain, and to protect, safeguards against manipulation. Specifically, the entries comprising the data transactions in the distributed ledger are monitored publicly, thereby making the distributed ledger robust against attacks.

It will be appreciated that the system implemented by way of the distributed ledger arrangement cannot be secured by physical solutions against malicious activities, such as surveillance and access control. Subsequently, the robustness of the system against malicious third-party attacks is facilitated by enhancing cyber-security measures for infrastructures (namely, the distributed ledger arrangement). Subsequently, the distributed ledger arrangement is made more reliable for users thereof. Specifically, cyber-security against attacks in critical infrastructures such as the distributed ledger arrangement (for example, a financial network implemented in a distributed ledger arrangement) prevents users of the critical infrastructures from vulnerable instances (such as identity thefts, fraudulent behaviours, and so forth). Optionally, the system is able to comprehend a normal state of operation of the system through artificial intelligence techniques (for example, machine learning algorithms) With the use of AI the system may be made more agile, robust, and flexible to adapt to new cyber-threat instances to prevent major disruptions and shut-downs of the system, an increase in operating reliability of the system is feasible to achieve.

In an example embodiment, the distributed ledger arrangement is any one of: a public ledger, a private ledger. Furthermore, the distributed ledger arrangement with public (namely, un-permissioned) control of access may be open for every participant (namely, each of the plurality of data processing nodes) within the system; however, it will be appreciated that it is highly desirable that data exchanges occurring in respect of the public distributed ledger are implemented via signals that are encrypted and/or obfuscated, to resist malicious third-party attacks, corruption or interference. Alternatively, the distributed ledger arrangement with private (namely, permissioned) control of access have an access control layer implemented therein; however, as aforesaid, it will be appreciated that it is highly desirable that data exchanges occurring in respect of the ledger are implemented via signals that are encrypted and/or obfuscated, to resist malicious third-party attacks, corruption or interference. Specifically, the plurality of data processing nodes have a control over who can join the system and who can participate in the consensus (as discussed later, herein) within the system. Additionally, such a distributed ledger arrangement has access protection rights with defined constraints regarding rights to be exploited by the plurality of data processing nodes.

Optionally, the distributed ledger arrangement is implemented by way of a blockchain platform. Specifically, in the blockchain platform, a given entry in the blockchain is stored in form of a block that stores a cryptographic hash of a previous entry, new information associated with the given entry and a timestamp associated with the given entry. Pursuant to embodiments of the present disclosure, the new information associated with the given entry in the distributed ledger arrangement may comprise the input data and/or a processed form thereof.

Furthermore, optionally, the distributed ledger arrangement, specifically, the blockchain platform is managed by a peer-to-peer network collectively adhering to a protocol for inter-record communication and validating new entries in the distributed ledger arrangement. Moreover, once an entry is recorded in the distributed ledger arrangement, the entry cannot be altered. Thus, storing the input data in the distributed ledger provides an immutable record comprising consensus pertaining to the input data with.

In an embodiment, one or more blocks within the blockchain platform have access rights associated thereto. The access rights allow and/or restrict users (namely, the plurality of data computing nodes) to read, store, move and modify information associated with the input data. Such access rights are beneficially implemented using private-public key encryption, alternatively or additionally, private-public key obfuscation.

The term "consensus" refers to a specific set of rules that the plurality of data processing nodes unfailingly enforce in order to validate an entry in the distributed ledger arrangement for, for example, addition of the entry. Furthermore, consensus regarding an operation refers to a general agreement of some or all of the plurality of data processing nodes in the distributed ledger arrangement in favour of an information relating to the operation. Conventionally, such consensus is reached by providing a proof of work, proof of stake or voting by the plurality of data processing nodes.

Optionally, pursuant to embodiments of the present disclosure, such consensus mechanisms possess plurality of technical problems relating to run-time, overhead computation, energy waste, employed unfair means, and so forth. Pursuant to embodiments of the present disclosure, the invention aims to overcome, at least partially, drawbacks associated with conventional consensus system and provides a technical solution to effectively overcome the aforesaid drawbacks.

It will be appreciated that the plurality of data processing nodes in the distributed ledger may access each of the entries in the distributed ledger and may own an identical copy of each of the entries. Notably, an alteration made to the distributed ledger is reflected almost instantly to each of the plurality of data processing nodes. Subsequently, an alteration (such as addition of an entry in the distributed ledger) is done when all or some of the plurality of data processing nodes perform a validation with respect to the alteration. In such a case, the entry is recorded (namely, added) in the distributed ledger in an immutable form when at least a threshold number of data processing nodes from the plurality of data processing nodes reach a consensus that the entry is valid. In other words, recording of the entry is denied when the threshold number of data processing nodes cannot reach a consensus regarding the validity of the entry. In an example, the threshold number of data processing nodes to reach a consensus may be fifty-one percent (51%) of the plurality of data processing nodes. Optionally, information in the distributed ledger is stored securely using cryptographic techniques. Beneficially, the distributed ledger allows reliable and transparent recordal of the entries, in that the data transactions (for example, exchange of a technical resource over a network) are permanently recorded and may not be capable of alterations. Thus, the distributed ledger provides greater transparency, enhanced security, improved traceability, increased efficiency and speed of operations.

Additionally, the system as described in the present disclosure optimises the operation of addition of entries in the distributed ledger in terms of run-time. Specifically, the system does not encounter decreased run time owing to an increase in a number of the plurality of data processing nodes. Moreover, the system facilitates an effective consensus for addition of an entry in the distributed ledger by employing time-efficient validation processes, thereby preventing instances of misconduct in the system by any of the plurality of data processing nodes.

Furthermore, the DAG is utilized to agree upon the set of data transactions required for adding the entry to the distributed ledger arrangement. Throughout the present disclosure, the term "directed acyclic graph" refers to a data structure that employs topological ordering for storage of data therein. Specifically, the DAG allows sequential traversal of data stored therein from earlier to later. Moreover, the DAG is parallelised that results in higher throughput. The DAG is utilised for defining relationships between entries in the distributed ledger arrangement. Beneficially, the DAG is employed to build the distributed ledger arrangement having intrinsic parallelism during addition of entries in the distributed ledger arrangement, during traversal within the distributed ledger arrangement, and during communication between the plurality of data processing nodes within the distributed ledger arrangement. Optionally, the DAG records partial ordering of events occurring over an asynchronous network of the plurality of data processing nodes. Beneficially, the DAG enhances scalability of the distributed ledger arrangement while recording the entries in the distributed ledger arrangement. Moreover, the addition of the entries in the distributed ledger arrangement is not impeded by network containing an increasing number of the plurality of data processing nodes.

Throughout the present disclosure, the term "data transaction" refers to an exchange of information. It will be appreciated that such information exchanged may relate to, for example, a physical system, a physical process, a service, a financial transaction, an arbitrary process, and so forth. Moreover, a data transaction occurs between at least two transacting parties, wherein a party from the at least two transacting parties offers the information to be exchanged and a party from the at least two transacting parties receives the information to be exchanged. Subsequently, the term "set of data transactions" refers to a collection of the data transactions as discussed herein above.

Optionally, the set of data transactions are provided to the system as the input data. More optionally, the input data may be provided by a data processing node form the plurality of data processing nodes, wherein the input data is recorded as an entry and is further added to the distributed ledger arrangement. Optionally, the input data may be provided by a user (such as a bot) associated with a data processing node, wherein the input data is acquired from a physical system connected to the data processing node. Subsequently, optionally, an input data is processed using a processor, for example, a processor of a data processing node providing the input data, to derive the data transaction information therefrom.

Furthermore, the set of data transactions are required to be added the entry to the distributed ledger arrangement. Moreover, the DAG is utilised for agreeing a set of data transactions. Subsequently, for the set of data transactions, at least two transacting parties involved in a given data transaction from the set of data transactions, generate a request for addition of the given data transaction to the distributed ledger arrangement. As a response, optionally, the system generates a computational task for addition of the set of data transactions as the entry in the distributed ledger arrangement.

Throughout the present disclosure, the term "computational task" refers to a general-purpose computing task that, when solved, provides validation for recordal of the plurality of operation records. Optionally, the system distributes the computational task across the plurality of data processing nodes. More optionally, some of the plurality of data processing nodes participate to solve the computational task in order to establish consensus within the system for addition of the set of data transactions as the entry in the distributed ledger arrangement. Moreover, such computational task includes, for example, intelligent interface tasks, machine learning tasks, image processing tasks, DNA sequence alignment tasks, speech recognition tasks, protein folding identification tasks, function generation tasks, cryptographic hash function tasks, and so forth. Optionally, a solution for such computational tasks may enable a data processing node from the plurality of data processing nodes to add a data transaction to the DAG. Optionally, the computational task may be utilised to facilitate addition of a data transaction as a node (namely, the vertex) in the DAG. Moreover, optionally, the computational task may be utilised to facilitate addition of a data transaction as an entry in the distributed ledger, for example as a block in a blockchain.

Optionally, the system operates to accommodate an executable contract object in the DAG, defining the computational task that is to be solved. More optionally, the entry in the distributed ledger have an associated code for a computer program (namely, the executable contract object) that is executed in response to a solution of the computational task. Notably, the executable contract object comprises a plurality of terms and conditions written in form of codes or algorithms. The computational task is embodied as terms and conditions of the executable contract object for addition of the set of data transaction, at an instance a single entry, in the distributed ledger. Moreover, when executed, the executable contract object causes automated addition of the set of data transactions as an entry in the distributed ledger. The executable contract object relating to an entry in the distributed ledger cannot be altered owing to decentralised execution of the distributed ledger. In other words, the distributed ledger prevents any one data processing node from controlling or altering the executable contract object added to the distributed ledger. In an example, the executable contract object is a smart contract.

In an example implementation, the distributed ledger is implemented as a blockchain. In such case, the blockchain may comprise a block storing the executable contract object, wherein the executable contract object is a smart contract.

It will be appreciated that solving the computational task is an energy-intensive task, wherein generation of a solution to the computational task is performed by the plurality of data processing nodes. In an example, the plurality of data processing nodes may perform computing algorithms for generation of the solution. Subsequently, performing such computing algorithms to solve the computational task leads to substantial consumption of data processing energy, energy dissipated as heat, and energy for facilitating cooling actions thereby increasing energy costs in providing fiat currencies substantially.

Therefore, optionally, the system generates the computational task such that the solution to such computational task is employed for broader purposes beyond mere validation to form consensus for addition of an entry in the distributed ledger. In such case, the energy cost for generating the solution for the computational task is partially recovered by providing solutions to the computational tasks that are utilised for applications beyond validation. In an example, a computational task generated by the system addresses a load pick-up scheduling problem, wherein a solution to the computational task is implemented so as to enable efficient scheduling and execution of load pick-up in a real-life instance.

Furthermore, a DAG is represented by way of the expression $G=(V,E)$ wherein V represents the vertices (a given vertex represented as $v_i$, therefore $v_i \in V$) in the directed acyclic graph (represented as G) and E represents the edges connecting the vertices. For each vertex $v_i$, the outgoing edges from the vertex are hash-references to exactly $k_{out}=2$ previous vertices. Each vertex also includes the round number of the entry in the distributed ledger arrangement and a digital signature from the data processing node that appended it to the DAG.

It will be appreciated that a given DAG comprises a set of genesis vertices at a time of initiation of the DAG. Subsequently, data processing nodes, that are elected using the decentralised beacon arrangement, can asynchronously add data transactions as vertices to the DAG that reference the genesis vertices, over a time period of the addition of the entry to the distributed ledger arrangement. Consequently, such vertices are then referenced by new vertices, which leads to propagation of the DAG. It will be appreciated that since the data processing nodes asynchronously add data transactions to the DAG, each data processing node may possess a slightly different copy of the DAG and this does not prevent addition of new vertices to the DAG. The slightly different copies of the DAG can be synchronised across the decentralised network upon termination of the DAG to update DAG replicas stored by the other data processing nodes.

The system employs the decentralised beacon arrangement that randomly elects the group of data processing nodes that operate to form the consensus of the entry to be added to the distributed ledger arrangement. Specifically, the decentralised beacon arrangement employs a mechanism namely, multi-party computation protocol. More specifically, the decentralised beacon arrangement is initiated during a 'set-up phase', wherein the set-up phase refers to a point of time in the distributed ledger arrangement when a previous entry has been added to the distributed ledger arrangement and a subsequent entry (namely, the entry) is to be added to the distributed ledger arrangement. Furthermore, the decentralised beacon arrangement randomly elects a group of data processing nodes from the plurality of data processing node. In an example, such a group of data processing nodes includes data processing nodes that have performed at least one of: addition of a vertex to an existing DAG, addition of a vertex to a new DAG, participation in validation of a data transaction.

It will be appreciated that the group of data processing nodes operate to include a plurality of vertices from the DAG as the entry to the distributed ledger arrangement. Specifically, each of the plurality of vertices comprise a data transaction therein. Optionally, the system provides the group of data processing nodes with authority to append vertices to the DAG associated with the entry. However, this authority to append vertices to the DAG associated with the entry by the group of data processing nodes may allow for misconduct (such as addition of invalid vertices in the DAG, wherein the invalid vertex may be fallacious or empty) by a data processing node. Therefore, the system restricts a number of vertices that may be appended by a data processing node in the group, to the DAG associated with the entry. Subsequently, malicious data processing nodes (such as the data processing node adding invalid vertices) are identified. Such malicious data processing nodes may be penalised for such misconduct.

It will be appreciated that a DAG comprises a plurality of vertices. Moreover, the vertices in the DAG stores data transactions therein. Furthermore, the set of data transactions recorded in the vertices of the DAG are added as, at an instance a single entry, to the distributed ledger arrangement. Optionally, each vertex of the plurality of vertices in the DAG represents a single data transaction. Additionally, the plurality of vertices in the DAG are connected by way of edges. Specifically, a first vertex is referenced from at least one previous vertex, wherein the previous vertex is recorded in the DAG. Moreover, the first vertex further references at least one future vertex. Such references between the plurality of vertices are established using the edges. In an example, a given first vertex is referenced from two previous vertices such that the references established using the edges are hash-references.

Additionally, optionally, a vertex in the DAG includes a round number associated with an entry relating to the vertex to the distributed ledger arrangement and a digital signature from a data processing node adding the vertex. Specifically, the term round number denotes a quantitative value representing a chronology of the entry in the distributed ledger. In an example, the round number for an entry is calculated based on a number of entries added in the distributed ledger arrangement before the entry. In such case, for an entry that is to be added after 'i' number of previously added entries, the round number will be 'i+1'. It will be appreciated that a vertex can only reference vertices with same or lower round number, thereby preventing fraudulent cases during addition of vertices in the DAG.

It will be appreciated that the DAG comprises tip vertices, wherein the tip vertices are referenced from at least one previous vertex, but such tip vertices are not further referenced by any vertex, at a given time.

Optionally, the plurality of data processing nodes operate to add vertices to the DAG asynchronously. More optionally, the vertices added by the data processing nodes are referenced from previous vertices (namely, genesis vertices) over a time period between entries being produced. Such a time period between two entries is referred as an epoch. Moreover, the term 'asynchronous' as used herein means that each of the data processing nodes from the plurality of data processing nodes keep on adding vertices to the DAG. Moreover, each of the data processing node form the group participating in forming the consensus may keep a slightly different copy of the DAG, to which they are adding vertices. However, such different copies of the DAG do not prevent addition of vertices thereto. Moreover, the vertices of the DAG are synchronised timely across a peer-to-peer network to update the copies of the DAG stored by each of the data processing nodes.

Beneficially, the DAG enables partial ordering of the plurality of vertices therein. Moreover, the DAG offers increased security at higher entry production rates owing to asynchronous operation thereof. Additionally, the DAG enables compact representation of the vertices thereby increasing entry throughput. Subsequently, the DAG can be extended throughout epoch, wherein the epoch for an entry is a time period between a previous entry and the entry, in the distributed ledger arrangement. Moreover, compact representation of vertices in the DAG enables faster communication between the vertices thereby eliminating time required for transitioning between vertices.

Furthermore, the group of data processing nodes elected by the decentralised beacon arrangement collaboratively build and decide upon the entry to be added to the distributed ledger arrangement by participating in forming of consensus for the entry. Specifically, the consensus for the entry is formed after a time when an entry preceding the entry is successfully added to the distributed ledger arrangement.

Optionally, the data processing nodes in the group of data processing nodes have mutually identical stakes to access a validation process that is employed to form the consensus. In such case, the data processing nodes elected to form the group by the decentralised beacon arrangement provide a stake to access the validation process that is employed to form the consensus. Specifically, a stake provided by a data processing node from the group, enables the data processing node to perform the computational task for validation and/or addition of a vertex for addition thereof, as an entry in the distributed ledger arrangement.

Furthermore, the system locks the stakes provided by the group of data processing nodes to access the validation process that is employed to form the consensus for the entry, for a given period of time. It will be appreciated that in a locked state, the stakes cannot be used for a consensus of a different entry than the entry. However, the system enables the data processing nodes to redelegate the stake for addition of, for example, a second consensus for addition of a second plurality of vertices as a second entry in the distributed ledger arrangement. In such case, a redelegate operation is initialised such that the locked stake is no longer used for participation in the consensus for the entry. Optionally, in case of a misconduct by a data processing node, for example, addition of a plurality of invalid vertices, the data processing node is penalised by slashing a stake provided by the data processing node. Such mechanism for acquiring mutually identical stakes from the group of data processing nodes for accessing the validation process that is employed to form the consensus for the entry ensures that each of the group of data processing nodes have associated uniform financial risks and rewards, owing to identical stakes. Moreover, the given period of time refers to the time between an entry that has been added and the addition of the entry, to the distributed ledger arrangement.

Moreover, such stakes provided by the group of data processing nodes needs to be resilient to attacks. In an example, in a public distributed ledger arrangement, a single data processing arrangement may control multiple stakes, and hence the system needs to be resistant to concerted attacks from more than 50% of data processing nodes providing stakes for consensus. Furthermore, in an instance, the system specifies a threshold stake (such as a threshold stake amount) that is to be provided by each of the data processing nodes in the group so as to participate in the validation for the entry. In another instance, the system organises a competitive process (such as an auction). In such case, a set of data processing nodes, selected from the group of data processing nodes providing stakes, is allowed to participate in the validation process employed to form the consensus for the entry, wherein the data processing nodes in the set are the nodes providing a stake at a higher percentile than a certain threshold.

Optionally, the group of data processing nodes collaboratively agree upon a random number such that the random number is defined for a time period corresponding to an epoch. Specifically, the term 'epoch' refers to a time period, wherein an epoch for the entry is a time period between an entry preceding the entry and the entry, in the distributed ledger arrangement. Notably, once a random number for a given entry is known, a subset of the plurality of data processing nodes can be identified, that will form a group of data processing nodes that operate to form a consensus of a succeeding entry to the given entry. Typically, such random number is included in the entry added by the group of data processing arrangement to the distributed ledger. Optionally, the random number is validated by each of the data processing nodes in the group. Beneficially, inclusion of the random number in the entry enables verification of sequence of the DAG associated with the entry in the distributed ledger arrangement throughout time. Furthermore, the random number enables verification of data processing nodes joining the plurality of data processing nodes in the distributed ledger arrangement. Moreover, such inclusion allows reproduction of the group of data processing nodes and/or DAG associated with an entry thereby allowing verification of the entire distributed ledger arrangement.

Pursuant to embodiments of the present disclosure, a random number of an entry preceding the entry to be added to the distributed ledger arrangement is employed by the decentralised beacon arrangement to elect the group of data processing nodes that operate to form the consensus of the entry to be added to the distributed ledger arrangement.

Additionally, optionally, the group of data processing nodes, collaboratively, creates at least one of: a verification key, a secret key, and a global key. Optionally, each of the data processing nodes in the group has an individual secret key. Specifically, the secret key refers to a virtual secret key that cannot be computed explicitly by a single data processing node in the group (which is an example that may be understood to be an effect similar or analogous to an effect resulting from one or more encryption functions). Moreover, the global key pair implicitly defines a verifiable random function such that the verifiable random function is a function of an input parameter. The secret key defined by the group of data processing nodes is employed to compute a value for the verifiable random function, wherein the input parameter for the verifiable random function is known to the group of data processing nodes. Furthermore, optionally, each of the data processing nodes in the group computes the value for the verifiable random function so as to include the value in the entry to be added by the group of data processing nodes to the distributed ledger arrangement. In an example, the value for the verifiable random function is employed to encrypt the random number to be included in the entry. Beneficially, adding the value for the verifiable random function in the entry prevents adversaries and malicious data processing nodes from predicting a random value for the entry before addition thereof to the distributed ledger arrangement. Such prevention form prediction of the random number of the entry prevents cyber-attacks to group of data processing nodes that will be elected for addition of an entry succeeding the entry. Subsequently, such protection against thefts and attacks enhances an overall security of the system.

Furthermore, the system employs the pseudo-random number generator engine to rank the data processing nodes within the group, wherein the order of adding the given data transaction to the DAG is based on ranking of the data processing nodes within the group. Specifically, the pseudo-random number generator engine operates to define a ranking to each of the data processing nodes in the group. Moreover, such ranking associated with a given data processing node in the group specifies an order for addition of a vertex comprising a data transaction, by the given data processing node to the DAG. Such ranking enables the system to implement a coordination mechanism in the DAG for efficient construction thereof. A data processing node having a ranking '1' will add a first vertex to the DAG, followed by a data processing node having a ranking '2', and so forth.

Moreover, a given data processing node of the group is designed by the system as the leading node of the group. Specifically, the leading node is a data processing node that notarises the DAG for inclusion of the DAG as the entry in the distributed ledger arrangement. Optionally, the leading node coordinates with each of the data processing nod in the group for creation of the random number, verification key, secret key, and global key pair. In an example, the leading node refers to a data processing node having a highest ranking.

Moreover, optionally, the pseudo-random number generator engine defines the random number that the group of data processing nodes agrees upon to enable the coordination mechanism in the DAG.

Furthermore, the system employs the control arrangement that enables the leading node to provide the final proposal to be included in the DAG, wherein the remainder of the data processing nodes of the group operate to notarize the final proposal to add the entry to the distributed ledger arrangement. Specifically, the leading node proposes a vertex (namely, a final vertex) as the final proposal to be included in the DAG associated with the entry. Specifically, a value of the final vertex for the DAG associated with the entry is a parameter that is specified at a protocol-level. A low parameter of the final vertex enables the leading node to restrict a number of vertices to be added as the entry to the distributed ledger arrangement. Alternatively, a high parameter of the final vertex enables the leading node to inclusion of a larger number of vertices as the entry to the distributed ledger arrangement. Beneficially, the final vertex is added to notarise each of the data transactions included in each of the vertices of the DAG associated with the entry. It will be appreciated that "high" and "low" are mutually relative terms here.

Optionally, when the leading node fails to propose the final vertex, a data processing node from the group having a second-highest ranking is employed to propose the final vertex.

Moreover, the remainder of the data processing nodes of the group operate to notarise the final proposal. Specifically, the final proposal (implemented as the final vertex) having a define parameter is notarised (namely, validated) by the data processing nodes of the group except the leading node. Beneficially, such notarisation of the final proposal enables identification of any fraudulent behaviour by the leading node, thereby preventing the leading node from misusing authority thereof.

The system operates to reduce potential misconduct by reducing an authority of each of the plurality of data processing nodes over addition of an entry in the distributed ledger arrangement. Optionally, providing an authority to a data processing node for addition of an entry may lead to misuse of such authority to implement misconduct behaviours. Examples of the misconduct behaviour may include, but are not limited to, addition of an empty entry that does not contain any data transaction therein, bribing of some data processing node to initiate double-spending attacks, denying service for addition of a specific data transaction an entry, and denying service for addition of a network of data transaction an entry. Moreover, such misconduct in behaviour of the data processing node may lead to conflict in terms of incentivisation of the data processing node for addition of the entry to the distributed ledger arrangement. More optionally, the data processing node may collude with some data processing nodes to gain incentive at an expense of incentives for other data processing nodes in the system.

Furthermore, optionally, upon successful notarisation of the final proposal provided by the leading node, the final vertex is published that references a tip-set (namely, $V_{tip}$). The $V_{tip}$ specifies a candidate vertex set $V_C$ for inclusion in the entry, defined as $$V_C = \bigcup_{v_i \in V_{tip}} \text{past}(v_i)$$

Moreover, optionally, the vertex set proposed by the leading node approximates a maximum candidate vertex set $|V_C|$. Furthermore, maximising the candidate vertex set maximises the stakes provided by the data processing nodes for participation in the validation process employed to form the consensus for the entry. Optionally, each of data processing nodes from the group providing stakes for participation in the validation process are allocated with voting rights on the consensus in proportion to at least one of: the stakes provided by each of data processing nodes, a cost incurred by each of data processing nodes for addition of a vertex to the DAG.

More optionally, the leading node shares a fixed fraction of an entry fee with each of the group of data processing nodes that operates to add vertices to the DAG and further forms the consensus for addition of the entry to the distributed ledger arrangement. In an example embodiment, the entry fee may be a sum of an entry reward and a transaction fee. It will be appreciated that the entry reward is provided by the system for addition of the data transactions in vertices and further as an entry in the distributed ledger arrangement, and the transaction fee is provided by parties performing the data transactions to be added.

It will be appreciated that a group of data processing nodes elected to add a subsequent entry succeeding the entry, will continue to add vertices to the DAG asynchronously that will contribute to the formation of the subsequent entry.

Optionally, the control arrangement provides a mechanism for at least partially anti-coordinating transactions to be included in the DAG, wherein the control arrangement utilises one or more algorithms to determine a structure of the DAG when rewarding the data processing nodes of the group, wherein
  (iii) the mechanism employs a strict ordering of nodes by specifying a time interval in which the data processing nodes are expected to add a given data transaction to the DAG, and
  (iv) the strict ordering is at least partially arbitrary, wherein the data processing nodes are assigned different slots in successive epochs of the distributed ledger arrangement (DAG).

Moreover, optionally, the system utilises a control arrangement that provides a mechanism for at least partially anti-coordinating transactions to be included in the DAG. Specifically, the anti-coordinating mechanism involves the group of data processing nodes elected to form the consensus. The control arrangement provides a mechanism that determines an order in which the data processing nodes may add data transactions to the plurality of vertices in the DAG. Consequently, the data processing nodes follow the order determined by the control arrangement to add data transactions to the DAG.

In another instance, the system optionally employs Schelling scheduling algorithm to implement a coordination mechanism in the DAG for efficient construction thereof. Optionally, the Schelling scheduling employs a node ordering defined using a Decentralized Random Beacon arrangement as a mechanism for anti-coordinating the addition of vertices to the DAG. Pursuant to one or more Schelling schedules, the decentralised beacon arrangement is used to provide a strict ordering of the data processing nodes. This strict ordering of the nodes provided by the Decentralized Random arrangement is used to specify a time interval in which they are expected to add a vertex to the DAG. Optionally, this strict ordering of the nodes provided by the Decentralized Random Beacon arrangement is arbitrary. Wherein the strict ordering of the data processing nodes is arbitrary, the random or pseudo-random characteristic of the Decentralized Random Beacon arrangement therefore ensures that the system assigns different slots in successive epochs of the distributed ledger arrangement.

Furthermore, the control arrangement utilises one or more algorithms to determine a structure of the DAG when rewarding the data processing nodes of the group. Specifically, the vertices added by the data processing nodes of the group, to the DAG are analysed so as to determine a reward for the each of the data processing nodes of the group. The one or more algorithms are explained herein using a simplified exemplary implementation. In the exemplary implementation, time for addition of the entry to the distributed ledger arrangement is represented as T and a synchronous setting is assumed wherein all the data processing nodes elected to form the consensus have access to an initial identical DAG data structure. The number of data processing nodes is represented as $\ell$. Furthermore, the reward for a data processing node for adding a vertex to the DAG is represented as P, the probability of a vertex being included in an entry defined as being in the past set of tip vertices, wherein the tip vertices are the vertices in the DAG that are yet to be referenced by other vertices. Furthermore, in the exemplary implementation, it is assumed that the data processing nodes adding the plurality of vertices to the DAG do so uniformly in n of the discrete time intervals. For n=1, only two vertices are included in the vertex set, wherein for n·2n≤ $\ell$, the rewards are specified by upper and lower bounds as:

$$\frac{2n}{\ell} \le P \le \frac{1}{\ell}\sum_{i=1}^{n} 2^i$$

wherein the lower bound applies in general and implied maximal reward P=1, for n=$\ell$/2. These imply that lower and upper bounds increase monotonically with n, which is a measure of the degree of the anti-coordination of data processing nodes in the consensus. It is to be understood that maximal anti-coordination is a Nash-equilibrium for the data processing nodes. In an example embodiment, to achieve such Nash-equilibrium, data processing nodes may add a vertex after a time, t, that is sampled from the uniform distribution on the interval, [0, T].

Optionally, one or more Schelling schedules specify a time interval in which data processing nodes of the group are expected to add a given data transaction to the DAG. In the aforementioned exemplary implementation, the data processing nodes append the plurality of vertices to the DAG during one of $\ell$/2 discrete time intervals with duration δt=2T/$\ell$ and vertices added in a particular time interval only contain references to vertices that were added in the time interval that immediately preceded it. Beneficially, the aforementioned Schelling schedules eliminate stochastic variation in distribution of waiting times. Furthermore, the one or more Schelling schedules encourages the data processing nodes to follow protocol and eliminates a possibility of deviation for anti-coordinating mechanism. Moreover, the present disclosure enables an equal rewarding system for data processing nodes adding data transactions to the DAG irrespective of the time of addition of data transaction thereby.

In an exemplary implementation of the system, each of the plurality of data processing nodes are known by a public key associated therewith that enables in specifying identity thereof. The identity of the data processing nodes is employed by the decentralised beacon arrangement to randomly elect the group of data processing nodes during a set up phase for the entry. In such case, data processing nodes that have not participated at any point in time in a set up phase for the decentralised beacon arrangement is restricted from appending vertices in the DAG. It will be appreciated that some vertices (namely, candidate vertex set) of the DAG storing data transactions therein, will be included in the distributed ledger as the entry. Moreover, the system imposes strict restriction to a number of vertices, in an instance, one vertex, that can be added by the group of data processing nodes. Subsequently, a penalty is levied upon a data processing node for deviation from such expected behaviour for adding more than one vertex to the DAG. Furthermore, the system allows data processing nodes of the group to join or leave the existing group for forming consensus for the entry. A size of the group of data processing nodes can be altered to provide an enhanced scalability to the system. The group of data processing nodes decide upon at least one of: random number, the verification key, the secret key, the global key pair. The parameters stated hereinabove are employed by each of the data processing nodes in the group for creation of vertices of the DAG. The group of data processing nodes decides a plurality of data transactions to be included in the vertices of the DAG. The group of data processing nodes provide stakes for participation in forming the consensus of the entry. Moreover, the group of data processing nodes perform the computational task specified in smart contracts associated with the plurality of data transactions, so as to include each of the plurality of data transactions as a vertex in the DAG. Furthermore, each vertex represents a data transaction from the plurality of data transactions. Furthermore, the group of data processing nodes compute a deterministic mapping between the vertices of the DAG to be included as the entry and the entry in the distributed ledger.

Moreover, the entry is recorded in the distributed ledger arrangement in a particular structure that is designed to optimise parallel transaction execution, that greatly increases throughput of the system with complex smart contracts. Moreover, computing nodes employed by the data processing nodes are utilised for mapping the candidate vertex set to the entry by each of the group of data processing nodes. Subsequently, the entry does not need to be synchronised across the peer-to-peer network. A pseudo random number generator engine is initiated to provide a ranking to each of the group of data processing nodes such that the data processing nodes in the group add a vertex in accordance with a ranking thereof. Moreover, a data processing node having the highest rank is designed to be the leading node for the consensus of the entry. The leading node further proposes a final vertex to notarise the candidate vertex set of the DAG to be included in the entry. The entry comprises the final vertex, the tip vertices of the DAG and information relating to the plurality of data transactions included in the candidate vertex set.

Beneficially, wasted storage associated with redundant data transactions present in vertices of the DAG is saved, owing to transient nature of the DAG without affecting a state of an entry in the distributed ledger arrangement.

Subsequently, saving storage reduces a cost of operation of the distributed ledger arrangement.

Optionally, the system operates to enable the plurality of data processing nodes to earn rewards (namely, incentive) from participating in the consensus in every epoch. Subsequently, temporal variability or risk of operating the data processing nodes is reduced thereby increasing participation of the plurality of data processing nodes in forming consensus.

The present disclosure also relates to the method as described above. Various embodiments and variants disclosed above apply mutatis mutandis to the method.

Optionally, the data processing nodes in the group of data processing nodes have mutually identical stakes to access a validation process that is employed to form the consensus.

Optionally, the method includes arranging for the input arrangement and the output arrangement to be coupled to a physical environment, wherein the input data includes sensed data representative of measurements from the physical environment, and the output data includes operative data to cause one or more changes within the physical environment, and wherein the method includes employing the entry added to the distributed ledger arrangement to change a physical state of the physical environment.

Optionally, the plurality of data processing nodes operate to add vertices to the DAG asynchronously.

Optionally, the method employs one or more Schelling schedules to specify a time interval in which data processing nodes of the group are expected to add a given data transaction to the DAG.

Optionally, the method comprises arranging for the control arrangement to provide a mechanism for at least partially anti-coordinating transactions to be included in the DAG, wherein the control arrangement utilises one or more algorithms to determine a structure of the DAG when rewarding the data processing nodes of the group, wherein (iii) the mechanism employs a strict ordering of nodes by specifying a time interval in which the data processing nodes are expected to add a given data transaction to the DAG, and (iv) the strict ordering is at least partially arbitrary, wherein the data processing nodes are assigned different slots in successive epochs of the distributed ledger arrangement (DAG).

In yet another aspect, an embodiment of the present disclosure provides a computer program product comprising a non-transitory computer-readable storage medium having computer-readable instructions stored thereon, the computer-readable instructions being executable by a computerised device comprising processing hardware to execute steps of the aforementioned method.

DETAILED DESCRIPTION OF THE DRAWINGS

Referring to FIG. 1, there is shown an illustration of a system 100 that operates to implement consensus for adding an entry to a distributed ledger arrangement 114, in accordance with an embodiment of the present disclosure. The system 100 has an input arrangement 102 that receives input data, and an output arrangement 120 that provides output data. Moreover, the system 100 includes a plurality of data processing nodes 106 that are mutually coupled together via a data communication network (not shown) to enable an exchange of data therebetween when in operation. Additionally, the plurality of data processing nodes 106 processes the input data and generates the output data, depending on operation of a distributed ledger arrangement 114 to which an entry is added to represent a temporal progression of events. Furthermore, a directed acyclic graph (not shown) is utilized to agree upon a set of data transactions required for adding the entry to the distributed ledger arrangement 114.

The system 100 employs a decentralized beacon arrangement 108, a pseudo-random number generator engine 110, and a control arrangement 112 to facilitate addition of the entry to the distributed ledger arrangement 114. Typically, the decentralized beacon arrangement 108 randomly elects a group of data processing nodes from the plurality of data processing nodes 106. The group of data processing nodes operate to form a consensus of the entry to be added to the distributed ledger arrangement 114. Moreover, the pseudo-random number generator engine 110 ranks the group of data processing nodes. In such a case, an order of adding a given data transaction to the DAG is based on ranking of the data processing nodes within the group. Additionally, a given data processing node of the group is designed by the system as a leading node of the group. Furthermore, the control arrangement 112 enables the leading node (not shown) to provide a final proposal to be included in the DAG. In such case, remainder of the data processing nodes of the group operate to notarize the final proposal to add the entry to the distributed ledger arrangement 114. Furthermore, the control arrangement 112 utilizes one or more algorithms to determine a structure of the DAG when rewarding the data processing nodes of the group. The system 100 locks the stakes provided by the group of data processing nodes to access the validation process that is employed to form the consensus for the entry, for a given period of time.

It will be understood by a person skilled in the art that the FIG. 1 includes a simplified illustration of the system 100 for sake of clarity only, which should not unduly limit the scope of the claims herein. The person skilled in the art will recognize many variations, alternatives, and modifications of embodiments of the present disclosure.

Figure 2:
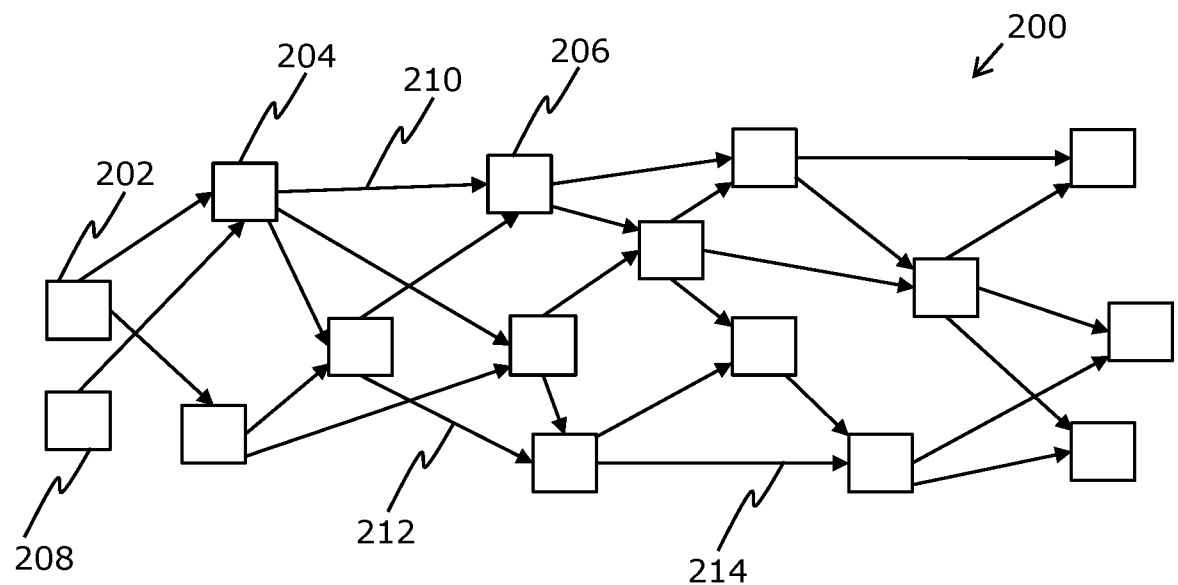
FIG. 2 is a schematic illustration of a of a directed acyclic graph, in accordance with an embodiment of the present disclosure.

Referring to FIG. 2, there is illustrated a schematic representation of a DAG 200, in accordance with an embodiment of the present disclosure. The DAG is utilized to agree upon a set of data transactions required for adding the entry to the distributed ledger arrangement. As shown, the DAG 200 comprises a plurality of vertices (depicted as vertices 202, 204, 206, 208) and a plurality of edges (depicted as edges 210, 212, 214). Moreover, a given vertex comprises a data transaction to be added to the distributed ledger. For each vertex, the outgoing edges from the vertex are hash-references to previous vertices. As shown, the outgoing edge 210 from the vertex 204 is the hash-reference to previous vertex 202. Each vertex 202, 204, 206 and 208 also includes the round number of the entry in the distributed ledger arrangement and a digital signature from the data processing node that appended it to the DAG 200. Furthermore, the DAG 200 comprises a set of genesis vertices (depicted as a genesis vertex 202 and a genesis vertex 208) at a time of initiation of the DAG 200.

It may be understood by a person skilled in the art that the FIG. 2 includes a simplified illustration of the DAG 200 for sake of clarity only, which should not unduly limit the scope of the claims herein. The person skilled in the art will recognize many variations, alternatives, and modifications of embodiments of the present disclosure.

Figure 3:
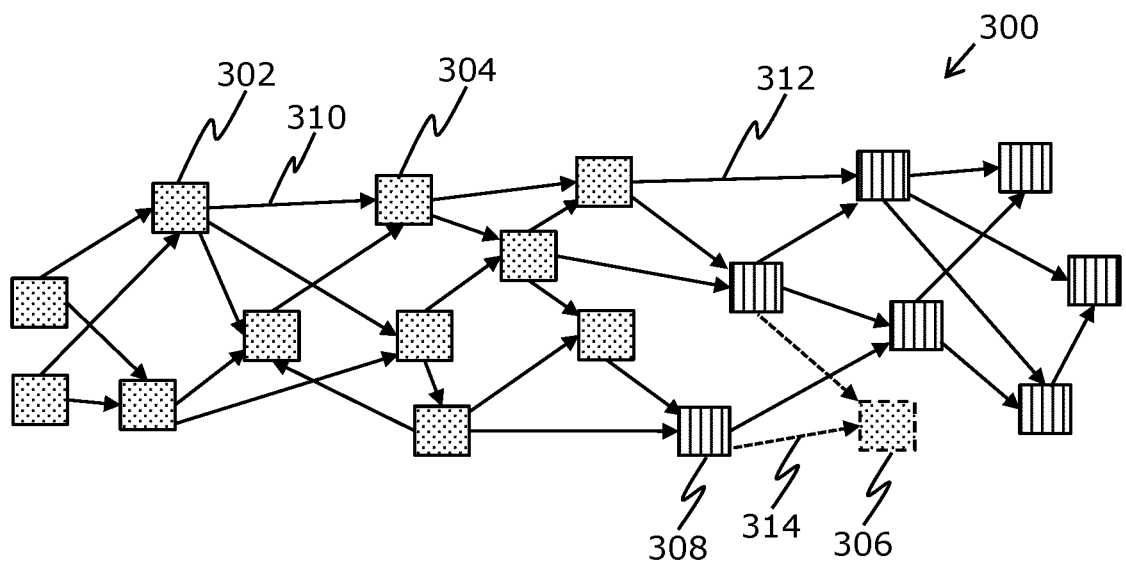
FIG. 3 is a schematic illustration of a directed acyclic graph comprising an invalid vertex, in accordance with an embodiment of the present disclosure.

Referring to FIG. 3, illustrated is a schematic representation of a DAG 300 comprising an invalid vertex, in accordance with an embodiment of the present disclosure. The DAG 300 is represented by way of a plurality of vertices (depicted as vertices 302, 304, 306, 308) and a plurality of edges (depicted as edges 310, 312, 314). With reference to the figure, the vertex 302, 304 and 306 belong to a round 'r'. Moreover, the vertex 308 belong to a round 'r+1'. It will be appreciated that the round 'r' includes vertices 302, 304 and 306 to form a consensus for a given entry. Furthermore, the round 'r+1' includes vertex 308 to form a consensus for an entry succeeding the given entry. As shown, the vertex 306 to be included in the round 'r' comprises reference from the vertex 308 to be included in the round 'r+1'. Therefore, it is to be understood that the data transaction in the vertex 306 is an invalid data transaction as a data transaction cannot be referenced form a future data transaction. Consequently, the vertex 306 will not be included in the DAG.

It may be understood by a person skilled in the art that the FIG. 3 includes a simplified illustration of a fraudulent behaviour by way of an invalid vertex in the DAG 300 for sake of clarity only, which should not unduly limit the scope of the claims herein. The person skilled in the art will recognize many variations, alternatives, and modifications of embodiments of the present disclosure.

Figure 4:
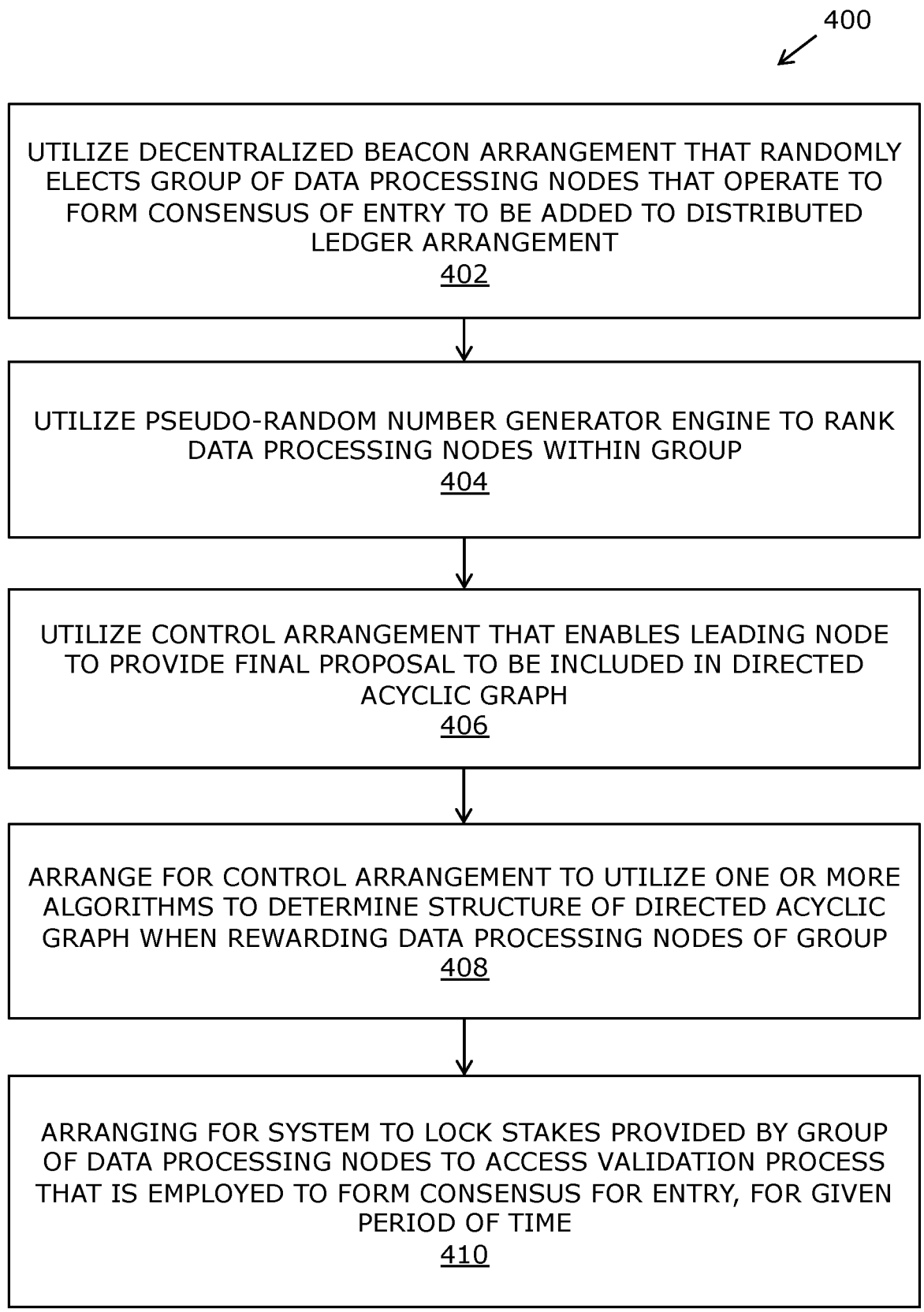
FIG. 4 is an illustration of steps of a method of operating a system for implementing consensus for adding an entry to a distributed ledger arrangement, in accordance with an embodiment of the present disclosure.

Referring to FIG. 4 there is shown an illustration of a flow chart of steps of a method 400 of (namely, a method for) operating a system for implementing consensus for adding an entry to a distributed ledger arrangement, in accordance with an embodiment of the present disclosure. In the method 400, the system has an input arrangement that receives input data and an output arrangement that provides output data. In the method 400, the system includes a plurality of data processing nodes that are mutually coupled together via a data communication network to enable an exchange of data therebetween when in operation. The plurality of data processing nodes processes the input data and generates the output data, depending on operation of the distributed ledger arrangement to which the entry is added to represent a temporal progression of events. In the method 400, the system utilises a DAG to agree upon a set of data transactions required for adding the entry to the distributed ledger arrangement.

At a step 402, a decentralized beacon arrangement is utilized that randomly elects a group of data processing nodes that operate to form a consensus of the entry to be added to the distributed ledger arrangement. At a step 404, a pseudo-random number generator engine is utilized to rank the data processing nodes within the group. An order of adding a given data transaction to the DAG is based on ranking of the data processing nodes within the group. Furthermore, a given data processing node of the group is designed to be a leading node of the group. At a step 406, a control arrangement is utilised that enables the leading node to provide a final proposal to be included in the DAG. Moreover, a remainder of the data processing nodes of the group operate to notarize the final proposal to add the entry to the distributed ledger arrangement. At a step 408, the control arrangement is arranged to utilize one or more algorithms to determine a structure of the DAG when rewarding the data processing nodes of the group. At a step 410, the system is arranged to lock the stakes provided by the group of data processing nodes to access the validation process that is employed to form the consensus for the entry, for a given period of time.

The steps 402 to 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system having an input arrangement that receives input data, and an output arrangement that provides output data,
   wherein the system includes a plurality of data processing nodes that are mutually coupled together via a data communication network to enable an exchange of data therebetween when in operation,
   wherein the plurality of data processing nodes processes the input data and generates the output data, depending on operation of a distributed ledger arrangement to which an entry is added to represent a temporal progression of events, wherein each of the plurality of data processing nodes comprises at least a processor and a memory,
   wherein a directed acyclic graph is utilized to agree upon a set of data transactions required for adding the entry to the distributed ledger arrangement, wherein the system, when in operation, employs:
   (i) a decentralized beacon arrangement that randomly elects a group of data processing nodes that operate to form a consensus on the entry to be added to the distributed ledger arrangement;
   (ii) a pseudo-random number generator engine to rank the data processing nodes within the group, wherein an order of adding a given data transaction to the directed acyclic graph is based on ranking of the data processing nodes within the group, wherein a given data processing node of the group is designed by the system as a leading node of the group; and
   (iii) a control arrangement that enables the leading node to provide a final proposal to be included in the directed acyclic graph, wherein a remainder of the data processing nodes of the group operate to notarize the final proposal to add the entry to the distributed ledger arrangement,
   wherein
   (iv) the control arrangement utilizes one or more algorithms to determine a structure of the directed acyclic graph when rewarding the data processing nodes of the group; and
   (v) the system locks stakes provided by the group of data processing nodes to access the validation process that is employed to form the consensus for the entry, for a given period of time.

2. The system of claim 1, wherein the data processing nodes in the group of data processing nodes have mutually identical stakes to access a validation process that is employed to form the consensus.

3. The system of claim 1, wherein the input arrangement and the output arrangement are coupled to a physical environment, wherein the input data includes sensed data representative of measurements from the physical environment, and the output data includes operative data to cause one or more changes within the physical environment, and wherein the entry added to the distributed ledger arrangement is employed to change a physical state of the physical environment.

4. The system of claim 1, wherein the plurality of data processing nodes operates to add vertices to the directed acyclic graph asynchronously.

5. The system of claim 1, wherein the system comprises one or more Schelling schedules configured to specify a time interval in which data processing nodes of the group are expected to add a given data transaction to the directed acyclic graph.

6. The system of claim 1, wherein the control arrangement is configured to provide a mechanism for at least partially anti-coordinating transactions to be included in the directed acyclic graph, wherein the control arrangement further comprises one or more algorithms to determine a structure of the directed acyclic graph when rewarding the data processing nodes of the group, wherein the mechanism is configured to employ a strict ordering of nodes by specifying a time interval in which the data processing nodes are expected to add a given data transaction to the directed acyclic graph, and the strict ordering is at least partially arbitrary such that the data processing nodes are assigned different slots in successive epochs of the distributed ledger arrangement.

7. A method for (of) operating a system having an input arrangement that receives input data, and an output arrangement that provides output data,
   wherein the system includes a plurality of data processing nodes that are mutually coupled together via a data communication network to enable an exchange of data therebetween when in operation,
   wherein the plurality of data processing nodes processes the input data and generates the output data, depending on operation of a distributed ledger arrangement to which an entry is added to represent a temporal progression of events, wherein each of the plurality of data processing nodes comprises at least a processor and a memory,
   wherein a directed acyclic graph is utilized to agree upon a set of data transactions required for adding the entry to the distributed ledger arrangement,
   wherein the method includes:
   (i) utilizing a decentralized beacon arrangement that randomly elects a group of data processing nodes that operate to form a consensus of the entry to be added to the distributed ledger arrangement;
   (ii) utilizing a pseudo-random number generator engine to rank the data processing nodes within the group, wherein an order of adding a given data transaction to the directed acyclic graph is based on ranking of the data processing nodes within the group, wherein a given data processing node of the group is designed to be a leading node of the group; and
   (iii) utilizing a control arrangement that enables the leading node to provide a final proposal to be included in the directed acyclic graph, wherein a remainder of the data processing nodes of the group operate to notarize the final proposal to add the entry to the distributed ledger arrangement, wherein the method further includes:
   (iv) arranging for the control arrangement to utilize one or more algorithms to determine a structure of the directed acyclic graph when rewarding the data processing nodes of the group; and
   (v) arranging for the system to lock mistakes provided by the group of data processing nodes to access the validation process that is employed to form the consensus for the entry, for a given period of time.

8. The method of claim 7, wherein the data processing nodes in the group of data processing nodes have mutually identical stakes to access a validation process that is employed to form the consensus.

9. The method of claim 7 wherein the method includes arranging for the input arrangement and the output arrangement to be coupled to a physical environment, wherein the input data includes sensed data representative of measurements from the physical environment, and the output data includes operative data to cause one or more changes within the physical environment, and wherein the method includes employing the entry added to the distributed ledger arrangement to change a physical state of the physical environment.

10. The method of claim 7 wherein the plurality of data processing nodes operates to add vertices to the directed acyclic graph asynchronously.

11. The method of claim 7 wherein the method employs one or more Schelling schedules to specify a time interval in which data processing nodes of the group are expected to add a given data transaction to the directed acyclic graph.

12. The method of claim 7 wherein the method comprises arranging for the control arrangement to provide a mechanism for at least partially anti-coordinating transactions to be included in the directed acyclic graph, wherein the control arrangement utilises one or more algorithms to determine a structure of the directed acyclic graph when rewarding the data processing nodes of the group, wherein the mechanism employs a strict ordering of nodes by specifying a time interval in which the data processing nodes are expected to add a given data transaction to the directed acyclic graph, and the strict ordering is at least partially arbitrary, wherein the data processing nodes are assigned different slots in successive epochs of the distributed ledger arrangement.

13. A computer program product comprising a non-transitory computer-readable storage medium having computer-readable instructions stored thereon, the computer-readable instructions being executable by a computerised device comprising processing hardware to execute a method as claimed in claim 7.

* * * * *